Figure 1:
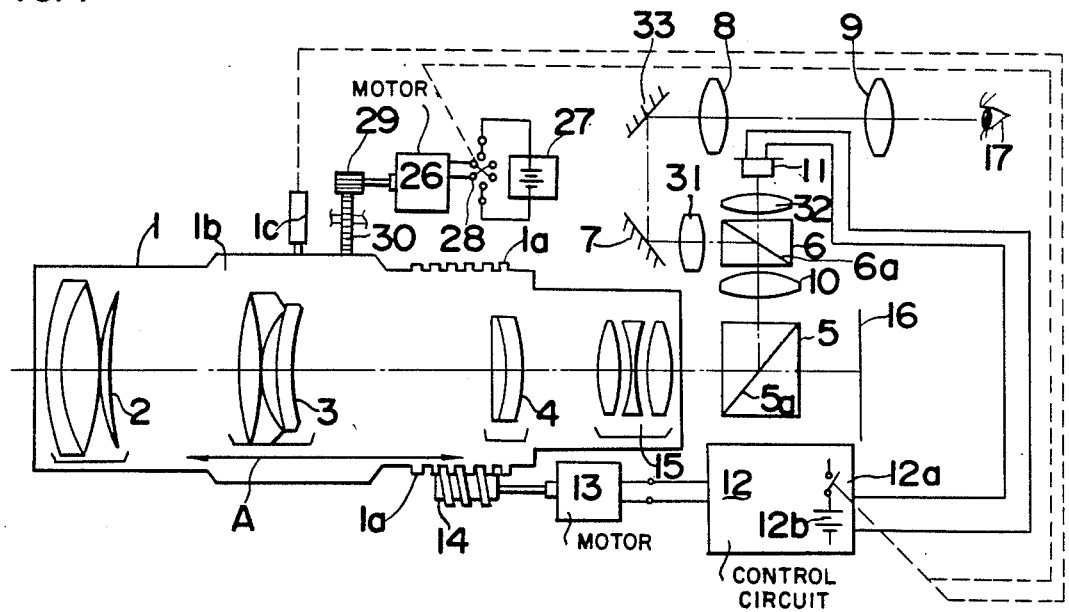

United States Patent [19]

Tsujimoto et al.

[11] 3,972,056

[45] July 27, 1976

[54] VARIFOCAL LENS ASSEMBLY

[75] Inventors: Kayoshi Tsujimoto, Osaka; Tohru Matsui; Haruo Abe, both of Sakai; Mitsuaki Horimoto, Osaka, all of Japan

[73] Assignee: Minolta Camera Kabushiki Kaisha, Osaka, Japan

[22] Filed: Dec. 4, 1974

[21] Appl. No.: 529,596

[30] Foreign Application Priority Data

Dec. 14, 1973  Japan.............................. 48-140508

[52] U.S. Cl.................................. 354/25; 250/201; 350/186; 352/140; 354/195; 355/57; 350/184;186;187

[51] Int. Cl.²......................... G03B 7/08; G01J 1/20

[58] Field of Search ............ 354/159, 25, 195, 197; 355/56, 57; 352/140, 142; 250/201

[56] References Cited
UNITED STATES PATENTS

| | | | |
|---|---|---|---|
| 3,614,921 | 10/1971 | Yamanaka et al.................... | 354/25 |
| 3,631,785 | 1/1972 | Perlman et al........................ | 354/25 |
| 3,678,835 | 7/1972 | Takishima.......................... | 355/56 X |

*Primary Examiner*—Richard A. Wintercorn
*Attorney, Agent, or Firm*—Wenderoth, Lind & Ponack

[57] ABSTRACT

A varifocal lens assembly of a type including at least two lens groups, a first lens group being axially movable parallel to the optical axis of the varifocal lens assembly for varying the focal length of the optical system of the varifocal lens assembly. An automatic focusing device is associated with the varifocal lens assembly to axially move the lens groups as a whole, the other or second lens group or a part of lens elements of the other or second lens group a predetermined distance to compensate for the image shift which takes place during the adjustment of the focal length effected by axially moving the first lens group.

6 Claims, 5 Drawing Figures

VARIFOCAL LENS ASSEMBLY

The present invention relates to a varifocal lens assembly for use with photographic, motion picture and television cameras.

A varifocal lens assembly or zoom lens assembly for use, for example, with a photographic camera is known which has an objective lens assembly the focal length of which can be varied as desired while an image of an object to be photographed, which has appeared in the field of view of an observer or photographer and which has been once-focused, will remain in focus at all times during adjustment of the focal length.

However, in most cases, variation of the focal length of the varifocal lens assembly often results in a displacement of the focal point from the position where the picture image has previously been focused. In order to avoid this, two methods have heretofore been practised: One is that the optical system including a plurality of groups of lens elements is specifically designed so as to optically compensate for the displacement of the focal point and the other is that a plurality of lens mounts for the respective groups of the lens elements, which are operatively mounted within a stationary barrel, are specifically coupled so as to mechanically compensate for the displacement of the focal point.

In both of these methods employed, the following difficulties have heretofore been encountered in the design of the varifocal lens assembly. Moreover, the focusing operation with the varifocal lens assembly has evoked similar difficulties.

In general, the varifocal lens assembly includes a group of front lens elements axially movably supported for focusing operation. The focusing operation effected by axially moving the front lens group is advantageous in that the picture image can remain in focus at all times during the adjustment of the focal length of the varifocal lens assembly. However, there is still a disadvantage found in the varifocal lens assembly of the type referred to above. In other words, in order to render the varifocal lens assembly capable of focusing an object to be photographed which is located a very small distance away from the varifocal lens assembly or the camera, the front lens group has to be of a size large enough to allow the incoming light, which carries the image of the object, to enter the front lens group at relatively great incidence and vergence angles.

Moreover, in order to make the minimum focal length available in the varifocal lens assembly capable of focusing the object at a very small distance away from the camera as small as possible so that the varifocal lens assembly can be used substantially as a combined wide-angle and telephoto lenses, the front lens group has to be of a sufficient size to allow the incoming light to enter the front lens group at greater incidence and vergence angles, or zonal image defects will otherwise occur.

In order to avoid an increase of the size of the front lens group without affecting the smallest possible minimum focal length of the varifocal lens assembly, the varifocal lens assembly may be designed so as to allow either the lens groups as a whole or a part or all of the master lens elements of another group to move axially predetermined distance. Whichever method is employed for this purpose, however, the axial movement of the lens groups as a whole or a part or all of the master lens elements results in displacement of the once-focused picture image out of focus and, therefore, a re-focusing operation is required each time the zooming operation has been effected, to bring the picture image in focus at the image plane where a photosensitive film is, for example, located. Automatic image shift compensation in this varifocal lens assembly is in fact possible, if complicated. Precise cam arrangements are employed to move the lens mounts for the respective lens groups in required modes. However, the employment of the complicated, precise cam arrangements in the lens mounts operatively supported within the stationary barrel obviously results in a varifocal lens assembly which is heavy and bulky and which requires rather complicated manufacturing procedures.

Accordingly, an essential object of the present invention is to provide an improved varifocal lens assembly which substantially eliminates the aforesaid disadvantages.

An important object of the present invention is to provide an improved varifocal lens assembly of the type referred to above, which can easily be manufactured substantially without taking into consideration how to avoid the image shift which may otherwise occur upon adjustment or variation of the focal length.

A further object of the present invention is to provide an improved varifocal lens assembly of the type referred to above in which the front or focusing lens group has a relatively small size and which can focus an object to be photographed, which is located a very small distance away from the varifocal lens assembly, and also which is available as combined wide-angle and telephoto lenses.

A still further object of the present invention is to provide an improved varifocal lens assembly of the type referred to above wherein focusing and zooming operations are simultaneously and automatically carried out.

According to the present invention, the varifocal lens assembly is designed so as to compensate for the image shift by moving the lens groups as a whole in a direction parallel to the optical axis of said varifocal lens assembly a predetermined distance required to achieve the image shift compensation, the movement of said lens groups being simultaneously effected by an automatic focusing device herein disclosed. Accordingly, both the focusing operation and the zooming operation can be simultaneously carried out.

Figure 2:
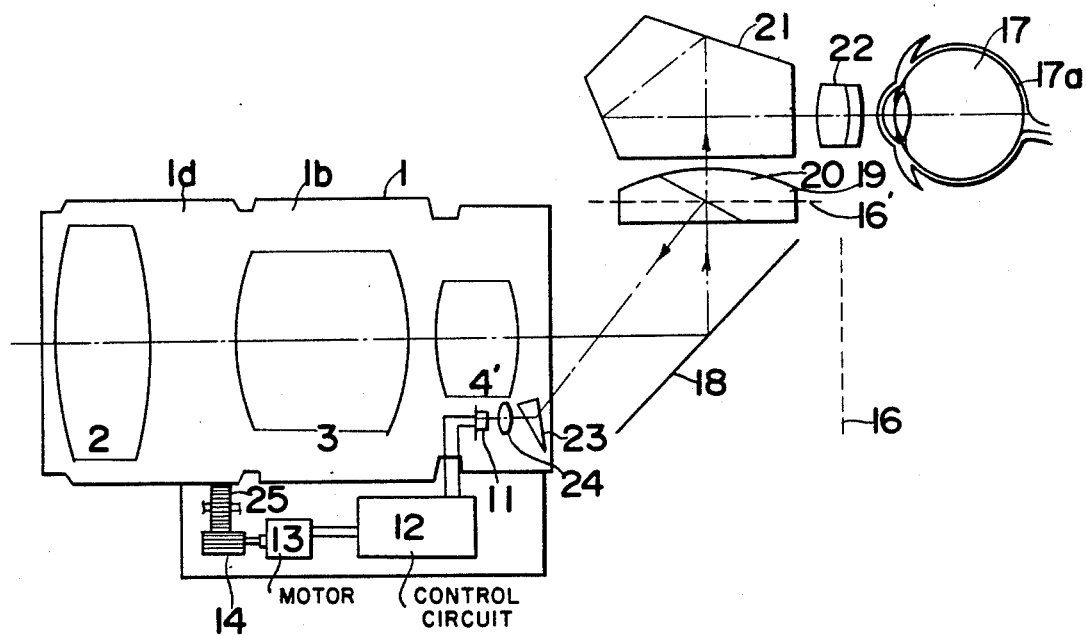
Figure 3:
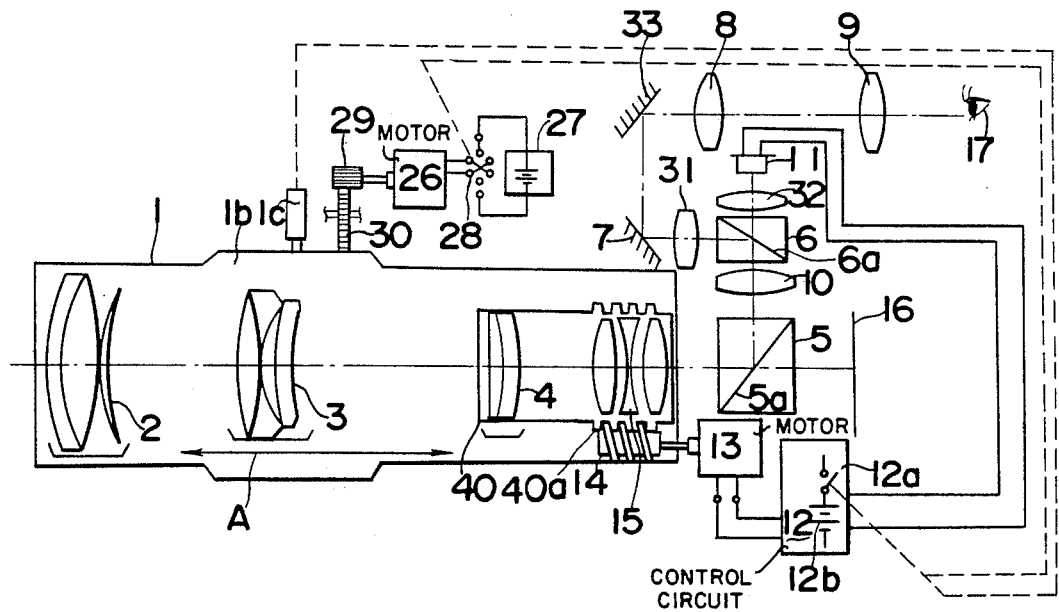
Figure 4:
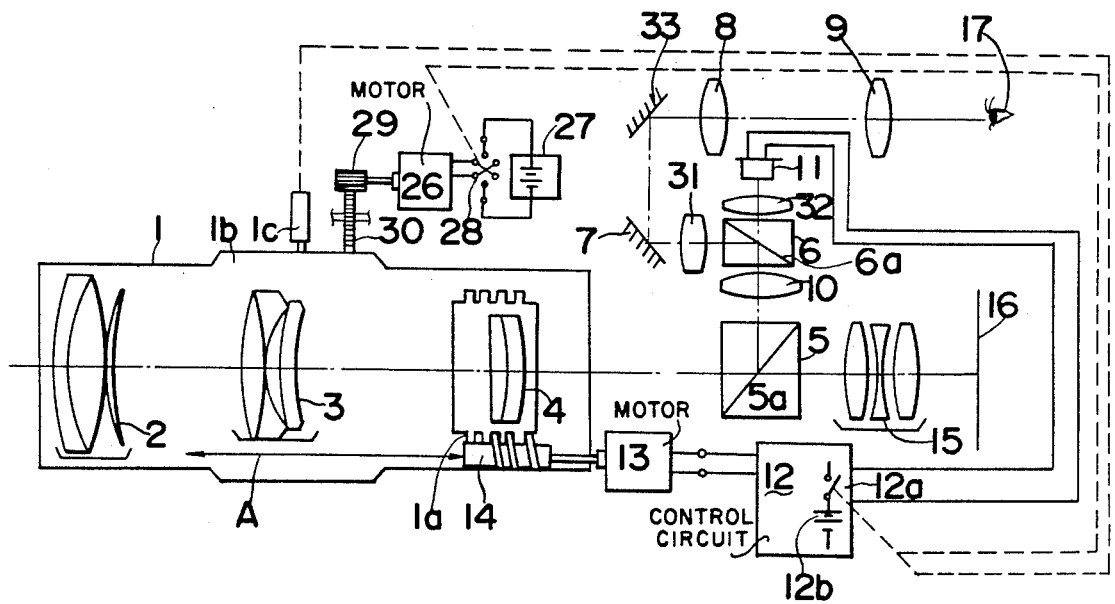
Figure 5:
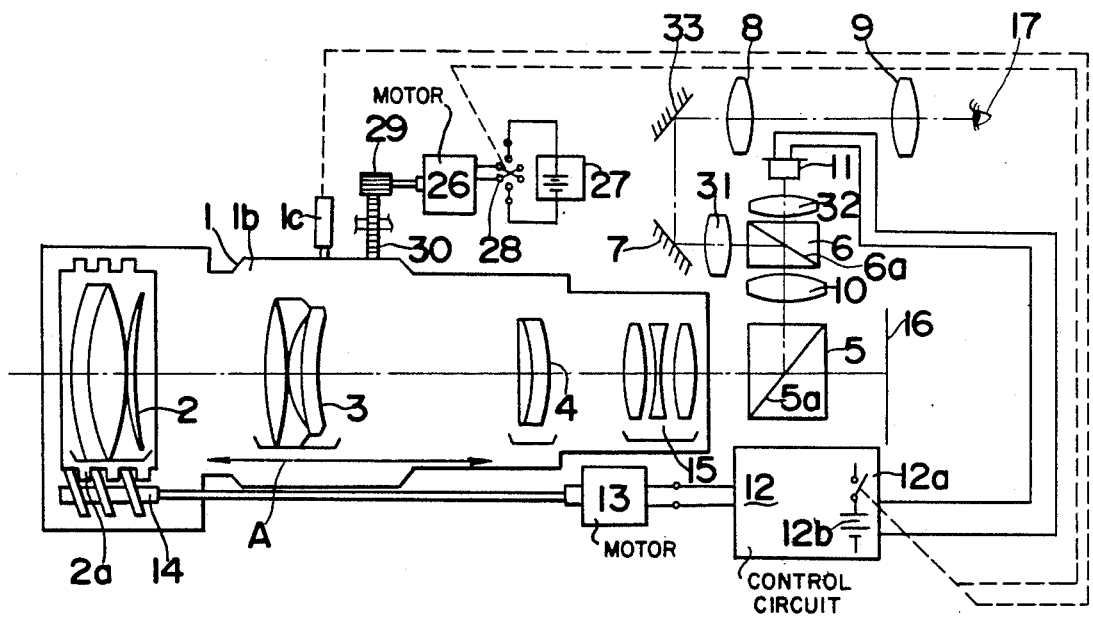

These and other objects and features of the present invention will become clear from the following description taken in conjunction with preferred embodiments thereof with reference to the accompanying drawings, in which:

FIG. 1 is a schematic longitudinal sectional view of a varifocal lens assembly for use with an 8mm. motion picture camera, incorporating an automatic focusing device according to one embodiment of the present invention, FIG. 2 is a schematic longitudinal sectional view of a varifocal lens assembly for use with a 35mm. single reflex camera, incorporating the automatic focusing device according to another embodiment of the present invention, FIGS. 3 to 5 are views similar to FIG. 1, showing other embodiments of the present invention.

Before the description of the present invention proceeds, it should be noted that like parts are designated by like reference numerals throughout the accompanying drawings.

Referring first to FIG. 1 which shows an example of the present invention as applied to a varifocal lens assembly for use with an 8mm. motion picture camera, the illustrated varifocal lens assembly comprises a lens barrel 1 including a zoom control ring 1b which may be referred to as a focal length adjusting ring. Within the lens barrel 1, there are a group of front lens elements 2, a group of variator lens elements 3 and groups of master lens elements 4 and 15. Each of these lens groups 2, 3, 4 and 15 may be composed of at least one lens element. The variator lens group 3 is operatively coupled to the variator control ring 1b in such a manner that rotation of the variator control ring 1b about the optical axis of said varifocal lens assembly causes said variator lens group 3 to move axially to vary the focal length of the entire varifocal lens assembly. In practice, the control ring 1b is provided with a radially outwardly extending handle or pin 1c, secured thereto for angular movement together with the control ring 1b, which is manually moved to rotate said control ring 1b. Alternatively, rotation of the control ring 1b can automatically be effected and, for this purpose, an automatic mechanism is provided as will now be described.

The automatic variator lens group control mechanism comprises an electrically driven reversing motor 26 electrically connected in series with a power source 27, for example, a battery, through a reversing switch assembly 28. The reversing switch assembly 28 is to be understood as having an operating piece movable selectively between first and second ON positions through a neutral or OFF position and is, therefore, to be understood as operable in such a manner that, when said operating piece is in the first ON position, said motor 26 rotates in one direction opposite to the direction of rotation thereof which is effected when said operating piece is in the second ON position and, when said operating piece is in the neutral position, said motor is deenergized.

The motor 26 is operatively coupled to the control ring 1b by means of a pinion 29 and a gear 30 so that rotation of the motor 26 can be transmitted to said control ring 1b to rotate the latter in one of the opposite directions depending upon the position of the operating piece of the reversing switch assembly 28.

The motion picture camera on which the varifocal lens assembly is mounted includes a prism 5 having a semi-transparent mirror 5a. This prism 5 is positioned on the optical axis so as to allow the incoming light to be split into two light components by the semi-transparent mirror, one being directed towards the focal plane 16 of the camera where an image of an object to be photographed is focused and the other being directed towards the viewfinder arrangement which will now be described.

The viewfinder arrangement includes a prism 6 having a semi-transparent mirror 6a which is positioned so as to split said second mentioned light component into two sub-components, one being directed to a photocell 11 through a lens element 32 and the other being directed to the sight of the eye of a photographer through a lens element 31, a mirror arrangement including a pair of mirrors 7 and 33 and a viewfinder eyepiece including a pair of spaced lens elements 8 and 9. It should be noted that the lens elements 10 and 32 are used to cause the light receiving surface of the photocell 11 to be positioned in optically conjugate relation to the focal plane 16 of the camera.

The photocell 11 forms a part of an automatic focusing device which will now be described. The automatic focusing device herein disclosed relies on the method of analyzing the frequency of an output signal from the photocell 11 which is generated in response to a pulsating light beam which has passed through a light interceptor, such as a slit, onto the photocell 11. This is possible because as is well understood by the skilled in the art, the spatial frequency of the image becomes a maximum when said image has been focused.

The automatic focusing device includes control circuitry 12 which carries out the foregoing method in response to the electric output signal from the photocell 11 and generates an output signal indicative of the coincidence or displacement of the image plane of the varifocal lens assembly with the focal plane 16, and an electrically operable reversing motor 13 which rotates in either direction depending upon the polarity of the output signal from the circuitry 12, said motor 13 being deenergized only when the image plane of the varifocal lens assembly coincides with the focal plane of the camera.

In any event, the automatic focusing device may be of any type and, for example, any of those disclosed in the U.S. Pat. Nos. 2,999,436, patented on Sept. 12, 1961, 3,495,913, patented on Feb. 17, 1970, and 3,511,155 patented on May 12, 1970 may be employed effectively and advantageously.

The motor 13 has a drive shaft having a worm gear 14 rigidly mounted therein in mesh with a rack 1a which may be either secured to or integrally formed with the lens barrel 1 for axially moving the lens groups 2, 3, 4 and 15 as a whole in either direction to bring the image plane of the varifocal lens assembly in a position coincident with the focal plane 16 of the camera. More particularly, the automatic focusing device operates in such a manner that if rotation of the control ring 1b, effected either automatically by the motor 26 or manually, results in departure of the image plane of the varifocal lens assembly from the focal plane 16 of the camera, the control circuitry 12 causes the motor 13 to rotate to achieve the image shift compensation. It is, therefore, clear that focusing and zooming operations can be effected simultaneously.

The control circuitry 12 is shown as including an on-off switch 12a connected in series with a battery power source 12b. This on-off switch 12 is adapted to be manually closed when the zooming operation is not desired and to be automatically closed in response to movement of the handle 1c when the zooming operation is effected. In either case, at the time the image shift compensation has completed in the manner as herinbefore described, the switch 12a is to be switched off to avoid waste of the battery 12b. It is to be noted that the switch 12a may be designed so as to be manually closed prior to the movement of the handle 1c even when the zooming operation is desired.

From the foregoing description, it has now become clear that, so long as the image of the object to be photographed is not focused on the focal plane 16 of the camera where a photosensitive film is located, the motor 13 continues to axially move the lens barrel 1, that is, the lens groups 2, 3, 4 and 15 as a whole, to bring the image plane of the varifocal lens assembly into coincidence with the focal plane 16 of the camera.

FIG. 2 illustrates an example of the present invention as applied to a 35mm single reflex camera. It is to be noted that reference numeral 4' represents a combination of the master lens groups 4 and 15 shown in FIG. 1, and that reference number 1d represents a manually operable focusing ring. Automatic focusing for the purpose of compensating the image shift resulting from variation of the focal length of the varifocal lens assembly is effected in substantially the same manner by the automatic focusing device having the construction as hereinbefore described. It is further to be noted that since the varifocal lens assembly shown in FIG. 2 is intended for use with a 35mm single reflex camera or like photographic camera, no automatic variator lens group control mechanism is provided.

In FIG. 2, the viewfinder arrangement is shown as including a pivotable mirror 18, a pentagonal prism 21 and an ocular lens 22, all of which constitute a major part of the optical system of a known single reflex camera together with the varifocal lens assembly. Between the mirror 18 and the pentagonal prism 21 is located a condenser lens 19 having a semi-transparent mirror 20. It is to be noted that in the viewfinder arrangement of FIG. 2, a Fresnel lens or any other focusing glass on which the picture image is projected through the optical system of the varifocal lens assembly is not provided. However, the picture image transmitted through the optical system of the varifocal lens assembly and subsequently reflected upon the pivotable mirror 18 towards the pentagonal prism 21 is formed on the imaginary plane 16', which is coincident with the focal plan 16 of the camera in the form of a spatial image. This spatial image is subsequently projected through the pentagonal prism 21, then the ocular lens 22, and finally the cyrstalline lens of the eye 17 of the photographer by which said spatial image is focused on the retina 17a of the eye 17. The semi-transparent mirror 20 in the conderser lens 19, which is angularly positioned on the imaginary plane 16', directs the picture image that has been projected on said imaginary plane 16' after having been reflected by the pivotal mirror 18 towards the light receiving surface of the photocell 11 through a light diverting prism 23 and a condenser lens 24. It should be noted that, while the prism 23 acts to deflect the path of travel of the incoming light from the semi-transparent mirror 20 to the photocell 11, the lens 24 acts to focus on the light receiving surface of the photocell 11 the picture image that has been reflected by the semi-transparent mirror 20 in the condenser lens 19.

In the embodiment shown in FIG. 2, the automatic focusing device including the photocell 11 is shown as being carried by the varifocal lens assembly. While the prism 23 and the lens 24 may be arranged either on the side of the camera or on the side of the varifocal lens assembly, it should be noted that during the operation of the automatic focusing device, that is, during the axial movement of the lens barrel 1, the positional relationship of the photocell 11, prism 23 and lens 24 should not vary in relation to the position of the semi-transparent mirror 20.

The axial movement of the lens barrel 1, that is, that of the lens groups 2, 3 and 4' as a whole, is preferably effected in a helically rotating manner. To this end, instead of the combined rack and worm gear arrangement employed in the embodiment of FIG. 1, a similar transmission system similar to that employed in the automatic varistor lens group control mechanism described with reference to FIG. 1 is employed. This transmission system includes a pinion gear 14 mounted on the shaft of the motor 13 and engaged to an intermediate gear wheel 25 which is in turn in mesh with a threaded portion formed on the outer periphery of the lens barrel 1. The varifocal lens assembly is designed so that as said lens barrel 1 is rotated about the optical axis, it can move axially while being guided by a helical cam mechanism (not shown) while it simultaneously rotates. This transmission system is advantageous in that even though the automatic focusing device is carried by the varifocal lens assembly for movement together therewith except for the photocell 11 and its associated optical elements 23 and 24, the axial movement of the lens groups 2, 3 and 4' as a whole can be ensured for the image shift compensation.

Instead of axially moving the lens groups as a whole for compensating for the image shift resulting from the adjustment of the control ring, that is, movement of the variator lens group 3, one or all of the master lens groups 4 and 15 may be axially moved. FIG. 3 illustrates an example wherein the master lens groups 4 and 15 as a whole are simultaneously axially moved.

Referring now to FIG. 3, the master lens groups 4 and 15 are mounted on a common lens mount 40 which is axially movably supported within the lens barrel 1. This common lens mount 40 has on its outer periphery an axially extending rack 40a which is in mesh with the worm gear 14. Therefore, it will readily be seen that during the operation of the motor 13 in search of the true focus setting, only the master lens groups 4 and 15 as a whole can be axially moved to compensate for the image shift resulting from the adjustment of the control ring b.

In the embodiment shown in FIG. 4, only one of the master lens groups 4 and 15 is made to move axially for the image shift compensation. An arrangement for effecting the axial movement of the master lens group 4 is substantially the same as the arrangement shown in FIG. 2. However, it is to be noted that, in this embodiment of FIG. 4, the other master lens group 15 has to be placed behind the prism 5 and in front of the focal plane 16 of the camera. The axial movement of only the master lens group 4 such as is effected in the embodiment of FIG. 4 requires corresponding movement of the condenser lens 10 or a combination of the lens elements 31 and 32.

In the embodiment shown in FIG. 5, only the front lens group 1 is caused to move axially for the image shift compensation. Even this embodiment of FIG. 5 satisfactorily operates in a substantially the same manner as any of the foregoing embodiments.

Although the present invention has been fully described in connection with the preferred embodiments thereof with reference to the accompanying drawings, it should be noted that various changes and modifications will be apparent to those skilled in the art. By way of example, so far as the embodiments are concerned, the arrangement thereof can equally be applicable to a varifocal lens assembly for use with any type of single reflex camera.

Therefore, these changes and modifications are, unless they depart from the true scope of the present invention, to be understood as included therein.

What is claimed is:

1. A varifocal lens assembly for use with a camera having a focal plane where an image of an object to be focused is projected, which comprises a lens barrel adapted to be coupled to said camera, an objective lens means supported within said lens barrel and including a plurality of lens groups other than a compensator lens group, a focal length varying means coupled to a first one of said lens groups for axially moving said first one of said lens groups along said lens barrel for varying the focal length of the varifocal lens assembly, adjusting means coupled to said varifocal lens assembly for adjusting the position of at least part of the varifocal lens assembly to adjust the position of the image plane formed by said varifocal lens assembly to compensate for the shift of the image plane resulting from the movement of said first lens group, means for detecting the position of the image plane where the object image is formed through said varifocal lens assembly and for subsequently generating an electric output signal in response to displacements between said image plane and the focal plane of the camera, and control means for operating said adjusting means in response to said electric output signal to bring said image plane into alignment with said focal plane.

2. A varifocal lens assembly as claimed in claim 1, wherein said adjusting means comprises means for axially moving said lens barrel in response to said electric output signal.

3. A varifocal lens assembly as claimed in claim 1, wherein said objective lens means comprises a second lens group axially movable along said lens barrel and said adjusting means comprises means for moving said second lens group in response to said electric output signal.

4. A varifocal lens assembly as claimed in claim 3, wherein said objective lens means comprises a front lens group and said second lens group is said front lens group.

5. A varifocal lens assembly as claimed in claim 3, wherein said objective lens means comprises a master lens group and said second lens group is said master lens group.

6. A varifocal lens assembly as claimed in claim 3, wherein said objective lens means comprises a master lens group having at least two sub-groups and said second lens group is one of said sub-groups.

* * * * *